US011713955B2

(12) United States Patent  
McKinster

(10) Patent No.: US 11,713,955 B2  
(45) Date of Patent: Aug. 1, 2023

(54) TAPE MEASURE WITH MAGNETIC RETRACTION SPEED CONTROLLER

(71) Applicant: Milwaukee Electric Tool Corporation, Brookfield, WI (US)

(72) Inventor: Scott Earl McKinster, Watertown, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/860,828

(22) Filed: Jul. 8, 2022

(65) Prior Publication Data

US 2022/0341719 A1  Oct. 27, 2022

Related U.S. Application Data

(63) Continuation of application No. 17/109,913, filed on Dec. 2, 2020, now Pat. No. 11,408,718, which is a continuation of application No. PCT/US2020/041606, filed on Jul. 10, 2020.

(60) Provisional application No. 62/873,653, filed on Jul. 12, 2019.

(51) Int. Cl.
  *G01B 3/102* (2020.01)
  *G01B 3/1003* (2020.01)
  *G01B 3/1005* (2020.01)

(52) U.S. Cl.
  CPC .......... *G01B 3/102* (2020.01); *G01B 3/1003* (2020.01); *G01B 2003/103* (2013.01)

(58) Field of Classification Search
  CPC . G01B 3/102; G01B 3/1003; G01B 2003/103
  See application file for complete search history.

(56) References Cited

U.S. PATENT DOCUMENTS

| | | | |
|---|---|---|---|
| 4,779,814 A | 10/1988 | Uetsuki et al. | |
| 4,807,828 A | 2/1989 | Yamaguchi | |
| 5,623,766 A | 4/1997 | Ruck et al. | |
| 5,749,534 A | 5/1998 | Morimoto | |
| 6,347,462 B1 | 2/2002 | Steinich | |
| 7,500,633 B1 | 3/2009 | Rudi et al. | |
| 7,717,366 B2 | 5/2010 | Alajajyan | |
| 8,215,027 B2 * | 7/2012 | Kang | G01B 3/1005 33/767 |
| 8,429,830 B2 * | 4/2013 | Kang | G01B 3/1005 33/767 |
| 10,836,603 B2 | 11/2020 | Vitas et al. | |
| 11,022,417 B2 | 6/2021 | McKinster | |

(Continued)

FOREIGN PATENT DOCUMENTS

| | | |
|---|---|---|
| EP | 2653428 | 10/2013 |
| WO | WO2021011379 | 1/2021 |

OTHER PUBLICATIONS

International Search Report and Written Opinion for International Application No. PCT/US2020/041606, dated Oct. 30, 2020, 12 pages.

*Primary Examiner* — Yaritza Guadalupe-McCall  
(74) *Attorney, Agent, or Firm* — Reinhart Boerner Van Deuren s.c.

(57) ABSTRACT

A tool, such as a tape measure, including a retraction system is shown. The tape measure includes a magnetic retraction speed controller. The magnetic retraction speed controller includes a magnet that induces an eddy current in a conductive component of the tool and slows a retraction speed.

21 Claims, 12 Drawing Sheets

(56) References Cited

U.S. PATENT DOCUMENTS

| | | | |
|---|---|---|---|
| 11,408,718 B2* | 8/2022 | McKinster | G01B 3/102 |
| 11,499,809 B2* | 11/2022 | Herritz | G01B 3/1041 |
| 2003/0160122 A1 | 8/2003 | Girtman et al. | |
| 2010/0212175 A1* | 8/2010 | Choi | G01B 3/1005 |
| | | | 33/761 |
| 2016/0311642 A1 | 10/2016 | Blair et al. | |
| 2018/0224263 A1* | 8/2018 | Kolade | G01B 3/1041 |
| 2021/0088316 A1 | 3/2021 | McKinster | |
| 2021/0102794 A1 | 4/2021 | Mueckl | |
| 2021/0247170 A1* | 8/2021 | McKinster | G01B 3/1005 |
| 2022/0341719 A1* | 10/2022 | McKinster | G01B 3/1003 |
| 2022/0363510 A1* | 11/2022 | Vitas | G01B 3/10 |

* cited by examiner

| | EDDY CURRENT TAPE 8 FT RETRACTION TIME (SECONDS) | | | | | | |
|---|---|---|---|---|---|---|---|
| | CONDUCTIVE DISK TEST | | MAGNET POLARITY TEST | | MAGNET SPACING TEST | | EDDY CURRENT EFFECT TEST |
| | CONDUCTIVE DISK- 5 MAGNETS- ALTERNATING POLE | CONDUCTIVE DISK- NO MAGNETS | CONDUCTIVE DISK- 5 MAGNETS- ALTERNATING POLES | CONDUCTIVE DISK- 5 MAGNETS- COMMON POLES | 3 MAGNET -22.5 DEGREE MAGNET SPACING- ALTERNATING POLE | 3 MAGNET -45 DEGREE MAGNET SPACING- ALTERNATING POLE | NONE- NO CONDUCTIVE DISK- NO MAGNETS | NO CONDUCTIVE DISK- 5 MAGNETS- COMMON POLE |
| 1 | 1.12 | 0.99 | 1.08 | 1.13 | 1.02 | 1.11 | 0.96 | 1.03 |
| 2 | 1.14 | 0.98 | 1.12 | 1.13 | 1.02 | 1.04 | 0.97 | 1.04 |
| 3 | 1.13 | 1.00 | 1.16 | 1.15 | 1.02 | 1.06 | 1.02 | 1.01 |
| 4 | 1.15 | 0.98 | 1.10 | 1.11 | 1.08 | 1.08 | 0.95 | 1.03 |
| 5 | 1.11 | 1.01 | 1.10 | 1.14 | 1.03 | 1.07 | 0.99 | 1.01 |
| 6 | 1.13 | 0.99 | 1.13 | 1.12 | 1.03 | 1.08 | 0.94 | 1.05 |
| 7 | 1.10 | 0.98 | 1.11 | 1.10 | 1.03 | 1.06 | 0.98 | 1.06 |
| 8 | 1.12 | 0.99 | 1.14 | 1.15 | 1.05 | 1.10 | 0.96 | 1.03 |
| 9 | 1.15 | 0.98 | 1.11 | 1.13 | 1.03 | 1.10 | 1.01 | 1.04 |
| 10 | 1.13 | 0.99 | 1.11 | 1.13 | 1.05 | 1.09 | 0.98 | 1.01 |
| AVERAGE | 1.13 | 0.99 | 1.12 | 1.13 | 1.04 | 1.08 | 0.98 | 1.03 |

FIG. 6A

| RUN | COPPER DISK (SECONDS) | | |
| --- | --- | --- | --- |
| | Cu DISK, 5 MAGNETS, ALTERNATING POLE, 3 WASHERS | Cu DISK, 5 MAGNETS, ALTERNATING POLE, 2 WASHERS | Cu DISK, 5 MAGNETS, ALTERNATING POLE, 1 WASHERS |
| 1 | 1.16 | 1.23 | 1.33 |
| 2 | 1.14 | 1.18 | 1.3 |
| 3 | 1.17 | 1.14 | 1.4 |
| 4 | 1.12 | 1.18 | 1.39 |
| 5 | 1.14 | 1.17 | 1.31 |
| 6 | 1.13 | 1.18 | 1.4 |
| 7 | 1.16 | 1.18 | 1.3 |
| 8 | 1.12 | 1.23 | 1.38 |
| 9 | 1.1 | 1.18 | 1.32 |
| 10 | 1.110 | 1.220 | 1.410 |
| AVERAGE | 1.14 | 1.19 | 1.35 |
| % CHANGE | 15% | 20% | 37% |

FIG. 6B

| 2ND PROTOTYPE - 20 PRELOAD TURNS - COPPER DISK (SECONDS) | | | | | | | |
|---|---|---|---|---|---|---|---|
| BASELINE - INJECTION MOLDED REAR HOUSING | Cu DISK, 6 MAGNETS, 1mm | Cu DISK, 5 MAGNETS, 1mm | Cu DISK, 4 MAGNETS, 1mm | Cu DISK, 3 MAGNETS, 1mm | Cu DISK, 2 MAGNETS, 1mm | Cu DISK, 1 MAGNETS, 1mm | BASELINE TEST REAR HOUSING |
| 0.74 | 5.30 | 3.48 | 2.74 | 1.63 | 1.34 | 1.11 | 0.88 |
| 0.73 | 5.34 | 3.46 | 2.86 | 1.62 | 1.33 | 1.13 | 0.86 |
| 0.75 | 5.54 | 3.52 | 2.81 | 1.64 | 1.36 | 1.07 | 0.88 |
| 0.75 | 5.36 | 3.47 | 2.83 | 1.63 | 1.32 | 1.10 | 0.87 |
| 0.75 | 5.37 | 3.50 | 2.81 | 1.65 | 1.35 | 1.07 | 0.86 |
| 0.74 | 5.25 | 3.36 | 2.78 | 1.66 | 1.33 | 1.09 | 0.88 |
| 0.74 | 5.10 | 3.46 | 2.79 | 1.61 | 1.34 | 1.06 | 0.87 |
| 0.74 | 5.24 | 3.54 | 2.82 | 1.61 | 1.32 | 1.11 | 0.86 |
| 0.75 | 5.28 | 3.51 | 2.83 | 1.61 | 1.34 | 1.07 | 0.88 |
| 0.75 | 5.46 | 3.50 | | | | | |
| 0.74 | 5.32 | 3.48 | 2.81 | 1.63 | 1.34 | 1.09 | 0.87 |
| | 511% | 299% | 222% | 87% | 53% | 25% | 0% |

FIG. 9A

| 2ND PROTOTYPE - 20 PRELOAD TURNS - ALUMINIUM DISK (SECONDS) | | | | | | |
|---|---|---|---|---|---|---|
| BASELINE TEST REAR HOUSING | Al DISK, 6 MAGNETS, 1mm | Al DISK, 5 MAGNETS, 1mm | Al DISK, 4 MAGNETS, 1mm | Al DISK, 3 MAGNETS, 1mm | Al DISK, 2 MAGNETS, 1mm | Al DISK, 1 MAGNETS, 1mm |
| 0.80 | 2.50 | 1.81 | 1.44 | 1.14 | 1.01 | 0.87 |
| 0.81 | 2.66 | 1.79 | 1.51 | 1.12 | 0.98 | 0.88 |
| 0.82 | 2.43 | 1.70 | 1.45 | 1.13 | 1.00 | 0.88 |
| 0.82 | 2.29 | 1.72 | 1.44 | 1.11 | 0.97 | 0.91 |
| 0.80 | 2.45 | 1.74 | 1.53 | 1.12 | 1.00 | 0.88 |
| 0.82 | 2.56 | 1.76 | 1.52 | 1.13 | 0.98 | 0.89 |
| 0.80 | 2.44 | 1.76 | 1.44 | 1.13 | 1.00 | 0.91 |
| 0.81 | 2.58 | 1.80 | 1.46 | 1.15 | 0.99 | 0.89 |
| 0.80 | 2.45 | 1.76 | 1.50 | 1.14 | 1.01 | 0.89 |
| 0.80 | 2.43 | 1.80 | 1.52 | | 0.99 | 0.88 |
| | | | | | | |
| 0.81 | 2.48 | 1.76 | 1.48 | 1.13 | 0.99 | 0.89 |
| 0% | 207% | 118% | 83% | 40% | 23% | 10% |

FIG. 9B

| | 2ND PROTOTYPE - 20 PRELOAD TURNS - NO DISK (SECONDS) | | | | | |
|---|---|---|---|---|---|---|
| BASELINE TEST REAR HOUSING | NO DISK, 6 MAGNETS, 1mm | NO DISK, 5 MAGNETS, 1mm | NO DISK, 4 MAGNETS, 1mm | NO DISK, 3 MAGNETS, 1mm | NO DISK, 2 MAGNETS, 1mm | NO DISK, 1 MAGNETS, 1mm |
| 0.74 | 1.14 | 1.01 | 0.85 | 0.82 | 0.77 | 0.74 |
| 0.72 | 1.14 | 1.00 | 0.84 | 0.80 | 0.76 | 0.72 |
| 0.71 | 1.15 | 1.01 | 0.85 | 0.80 | 0.77 | 0.74 |
| 0.72 | 1.13 | 0.99 | 0.85 | 0.80 | 0.77 | 0.73 |
| 0.72 | 1.15 | 0.99 | 0.85 | 0.81 | 0.77 | 0.74 |
| 0.72 | 1.12 | 0.98 | 0.85 | 0.81 | 0.77 | 0.73 |
| 0.72 | 1.14 | 0.98 | 0.85 | 0.80 | 0.77 | 0.74 |
| 0.72 | 1.13 | 0.98 | 0.85 | 0.81 | 0.76 | 0.73 |
| 0.71 | 1.12 | 0.97 | 0.85 | 0.81 | 0.76 | 0.73 |
| 0.72 | 1.12 | 0.99 | 0.85 | 0.81 | 0.76 | 0.73 |
| 0.72 | 1.13 | 0.99 | 0.85 | 0.81 | 0.77 | 0.73 |
| 0% | 58% | 38% | 18% | 12% | 6% | 2% |

FIG. 9C

TAPE MEASURE WITH MAGNETIC RETRACTION SPEED CONTROLLER

CROSS-REFERENCE TO RELATED PATENT APPLICATIONS

The present application is a continuation of U.S. application Ser. No. 17/109,913, filed Dec. 2, 2020, which is a continuation of International Patent Application No. PCT/US2020/041606, filed Jul. 10, 2020, which claims the benefit of and priority to U.S. Provisional Application No. 62/873,653, filed on Jul. 12, 2019, which are incorporated herein by reference in their entireties.

BACKGROUND OF THE INVENTION

The present invention relates generally to the field of tools. The present invention relates specifically to a tape measure, measuring tape, retractable rule, etc., that includes a retraction system having a magnetic retraction speed controller.

Tape measures are measurement tools used for a variety of measurement applications, including in the building and construction trades. Some tape measures include a graduated, marked blade wound on a reel and also include a retraction system for automatically retracting the blade onto the reel. In some typical tape measure designs, the retraction system is driven by a coil or spiral spring that is tensioned, storing energy as the tape is extended and that releases energy to spin the reel, winding the blade back onto the reel.

SUMMARY OF THE INVENTION

One embodiment of the invention relates to a tape measure including a magnetic retraction speed control system. The retraction speed control system includes at least one magnet arranged such that rotation of the tape reel induces eddy currents within a conductive material within the tape housing. The eddy currents create magnetic fields which in turn interact with the magnetic fields of the at least one magnet causing the braking of the rotation of the reel. In some embodiments, the retraction speed control system includes at least two magnets.

Another embodiment of the invention relates to a tape measure including a housing, a tape reel rotatably mounted within the housing and a tape blade wound around the tape reel and extendible from the housing. The tape measure includes a hook assembly coupled to an outer end of the tape blade and a spring coupled to the tape reel. As the tape blade is unwound from the tape reel to extend from the housing, the spring stores energy, and wherein the spring releases energy driving rewinding of the tape blade on to the tape reel. The tape measure includes a magnetic retraction speed control system. The magnetic retraction speed control system includes a conductive element supported within the housing and an array of magnetic material arranged within the housing and positioned relative to the conductive element such that rotation of the tape reel generates relative movement between the conductive element and the array of magnetic material induces eddy currents within the conductive element such that a retraction speed of the tape reel during rewinding is reduced.

Another embodiment of the invention relates to a tape measure including a housing, a tape reel rotatably mounted within the housing, a tape blade wound around the tape reel and extendible from the housing and a retraction mechanism configured to drive rotation of the tape reel to provide retraction of the tape blade. The tape measure includes a magnetic retraction speed control system including a magnet arranged within the housing such that rotation of the tape reel induces an eddy current within a conductive material located inside of the housing.

Another embodiment of the invention relates to a measuring tool including a housing, a reel rotatably mounted within the housing, a coilable measuring component wound around the reel and extendible from the housing and a retraction mechanism configured to drive rotation of the reel to provide retraction of the coilable measuring component. The tape measure includes a magnetic retraction speed control system including a magnet positioned in the housing such that rotation of the reel induces eddy currents within a conductive material located inside of the housing such that a retraction speed of the reel during retraction is reduced.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments, and together with the description serve to explain principles and operation of the various embodiments.

BRIEF DESCRIPTION OF THE DRAWINGS

FIG. 6A is a table showing retraction speed tests for various tape measures with and without a magnetic retraction speed control system.

FIG. 6B is a table showing retraction speed tests for various tape measures with a copper-based magnetic retraction speed control system.

FIGS. 9A, 9B and 9C show tables showing retraction speed tests for various designs of a magnetic retraction speed control system of FIGS. 7 and 8, according to an exemplary embodiment.

DETAILED DESCRIPTION

Figure 1:
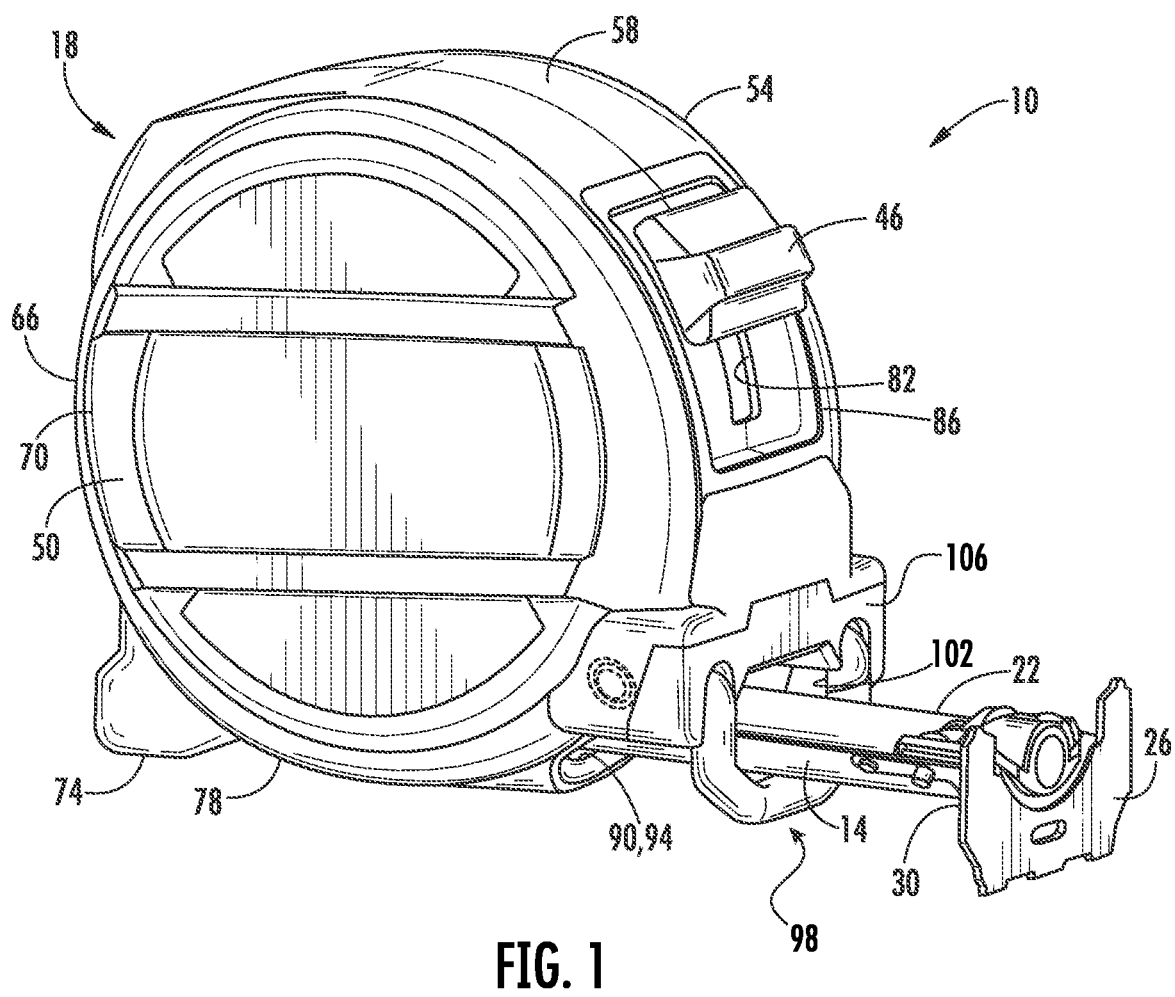
FIG. 1 is a left side perspective view of a tape measure, according to an exemplary embodiment.

Referring generally to the figures, various embodiments of a tape measure are shown. Various embodiments of the tape measure discussed herein include an innovative retraction system designed to provide for a variety of desired operation characteristics, including controlled/reduced retraction speed. Some tape measure blades are susceptible to damage/breakage due to high speed during retraction. For example, high speeds during retraction may cause the tape blade to whip (e.g., the tendency of the tape measure blade to bend or snap back on itself during fast retraction), which can crack or tear the tape blade, and similarly, high retraction speeds can damage the tape blade when the tape hook contacts the tape housing at the end of retraction. Applicant believes that the magnetic retraction speed control provided by the tape measure discussed herein can limit such sources of tape measure damage. Further, Applicant believes that the magnetic retraction speed controller provided by the tape measure discussed herein can do this while providing a variety of additional advantages associated with a more powerful tape retraction system.

As will generally be understood, in certain tape measure designs, a spring stores energy during tape blade extension and applies a force/torque to a reel causing the tape blade to wind onto the reel during tape blade retraction. Various aspects of spring designs, such as spring energy, torque profile, spring constant, etc., are selected to ensure that operation of the spring has enough energy to provide satisfactory tape retraction. However, because of the physics and characteristics of the typical tape measure spiral spring, in order to ensure full tape retraction at a satisfactory speed, the typical tape measure spiral spring delivers excess energy to the tape blade during retraction, which in turn translates into undesirably high retraction speeds and whip, particularly toward the end of retraction. Further, the excess energy delivered by the spring (or other retraction systems) also is desirable to account for excess friction caused by debris/dirt located within the tape housing, while providing the feel of powerful retraction that Applicant has determined is desirable to some tape measure users.

As discussed herein, Applicant has developed a tape measure blade retraction system that includes a magnetic retraction speed controller. In particular, the retraction speed controller discussed herein utilizes one or more magnets to induce eddy currents within one or more conductive components within the tape measure during rotation of the tape reel. The eddy currents themselves create a magnetic field that, when in motion relative to the magnetic field of a magnet, opposes the movement relative to the magnets. The faster that the magnets move relative to the conductive component, the more opposition to the relative motion that the eddy current generates.

In the design disclosed, when the tape blade is reeled in or payed out slowly, the slow rotational speed generates small eddy currents, and thus the effects of the eddy currents generated magnetic fields on rotational speed are also small. However, as the tape blade is reeled in more quickly, the eddy currents generated increase with increasing reel speed. The higher level of eddy currents generate a larger opposing magnetic field, which in turn provides a greater braking interaction with the magnetic fields of the magnets. In this manner, the eddy current effects act to slow down the speed of the tape reel, and thereby provide an upper rotational speed limit on the spool. Through the arrangement of magnets within the tape measure housing, this upper rotational speed limit can be set to reduce/eliminate the likelihood of tape whip during retraction.

Using the magnetic retraction speed controller discussed herein, Applicant is able to provide a tape measure with a number of benefits over tape measures without such a speed controller. For example, the speed controller discussed herein allows a stronger retraction spring (e.g., stronger than typical given a particular tape length and/or housing size) to be used while still preventing whipping of the blade during retraction. In such embodiments, the stronger spring is beneficial for faster retraction at relatively short distances (e.g., retraction of 12 inches of blade) where blade whipping is not caused. In addition, Applicant believes that the stronger retraction spring enabled by the magnetic retraction speed control system provides better contamination resistance (e.g., as the housing, blade, and spool fill with debris and friction is increased, the spring is still strong enough to fully retract the spring). In addition, Applicant further has identified that increased spring strength provides better perceived experience for users who prefer a strong retraction force. These benefits can be achieved while still preventing whipping, which is the primary cause of tape blade failures.

Figure 2:
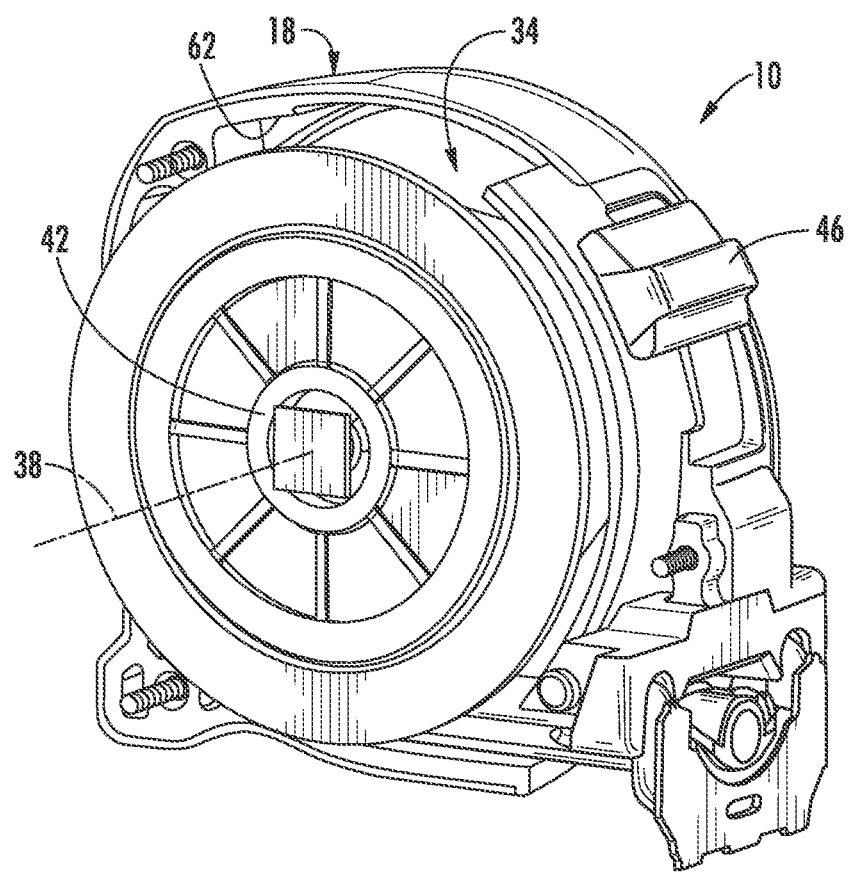
FIG. 2 is a left side perspective view of the tape measure of FIG. 1 with a portion of the tape measure housing removed, according to an exemplary embodiment.

Referring to FIG. 1 and FIG. 2, a tool or measuring tool, such as tape measure 10, is shown according to an exemplary embodiment. Tape measure 10 includes a coilable measuring component, shown as coilable tape blade 14, and a housing 18. In general, tape blade 14 is an elongate strip of material including a plurality of graduated measurement markings, and in specific embodiments, tape blade 14 is an elongate strip of metal material (e.g., steel material) that includes an outermost end coupled to a hook assembly, shown as hook assembly 26. Tape blade 14 may include various coatings (e.g., polymer coating layers) to help protect tape blade 14 and/or the graduated markings of the blade from wear, breakage, etc.

As shown in FIG. 1, a variable-length extended segment 22 of the tape blade 14 is retractable and extendable from the housing 18. Hook assembly 26 is fixedly coupled to an outer end portion 30 of tape blade 14. In various embodiments, tape blade 18 has a maximum length that may be extended from the housing of between 10 ft. and 50 ft.

As shown in FIG. 2, the non-extended portion of tape blade 14 is wound onto a reel 34, which is surrounded by housing 18. Reel 34 is rotatably disposed about an axis 38 of tape measure 10, and a retraction mechanism 42 is coupled to reel 34 and configured to drive reel 34 about rotation axis 38, which in turn provides powered retraction of tape blade 14. Retraction mechanism 42 may include one or more elongated spiral springs that provide the retraction energy to retraction mechanism 42. In other embodiments, retraction mechanism 42 includes other mechanisms such as one or more electric motors. A tape lock 46 is provided to selectively engage tape blade 14, which acts to restrain retraction mechanism 42 such that extended segment 22 of tape blade 14 remains at a desired length.

Referring to FIG. 1, housing 18 includes a first side wall 50, a second side wall 54, and a peripheral wall 58 connecting first side wall 50 and second side wall 54. First side wall 50, second side wall 54, and peripheral wall 58 define an internal cavity 62, shown in FIG. 2, in which reel 34 and retraction mechanism 42 are housed. Referring to FIG. 1, first side wall 50 and second side wall 54 have a substantially circular profile 66. In other embodiments, the side walls may be rectangular, polygonal, or any other desired shape. Portions of the housing 18 may be co-molded or separately formed of a resilient material, such as a natural or synthetic rubber. In the illustrated construction, housing 18 is formed with housing bumpers 70 and a support leg 74, which extends from a lower portion 78 of the peripheral wall 58.

A slot 82 is defined along a forward portion 86 of peripheral wall 58. Slot 82 provides an opening in the tape measure housing, which allows tape lock 46 to extend into housing 18. In addition, slot 82 provides a length sufficient to allow tape lock 46 to be moved relative to housing 18 between locked and unlocked positions.

Below the slot 82, a tape blade opening in the housing, shown as tape port 90, is provided in peripheral wall 58. Tape port 90 has an arcuate shape 94, corresponding to an arcuate cross-sectional profile of tape blade 14. The tape port 90 allows for the retraction and extension of tape blade 14 to and from the internal cavity 62 defined within housing 18.

As shown in FIGS. 1 and 2, tape measure 10 includes a finger guard assembly 98. Finger guard assembly 98 includes a guard 102 and a guard support member 106. As shown in FIG. 1, the portions of guard 102 external to housing 18 are substantially U-shaped and extend downward from housing 18. As shown in FIG. 2, when tape 14 is in the retracted position, a rear surface of the hook assembly 26 abuts guard 102.

Figure 3:
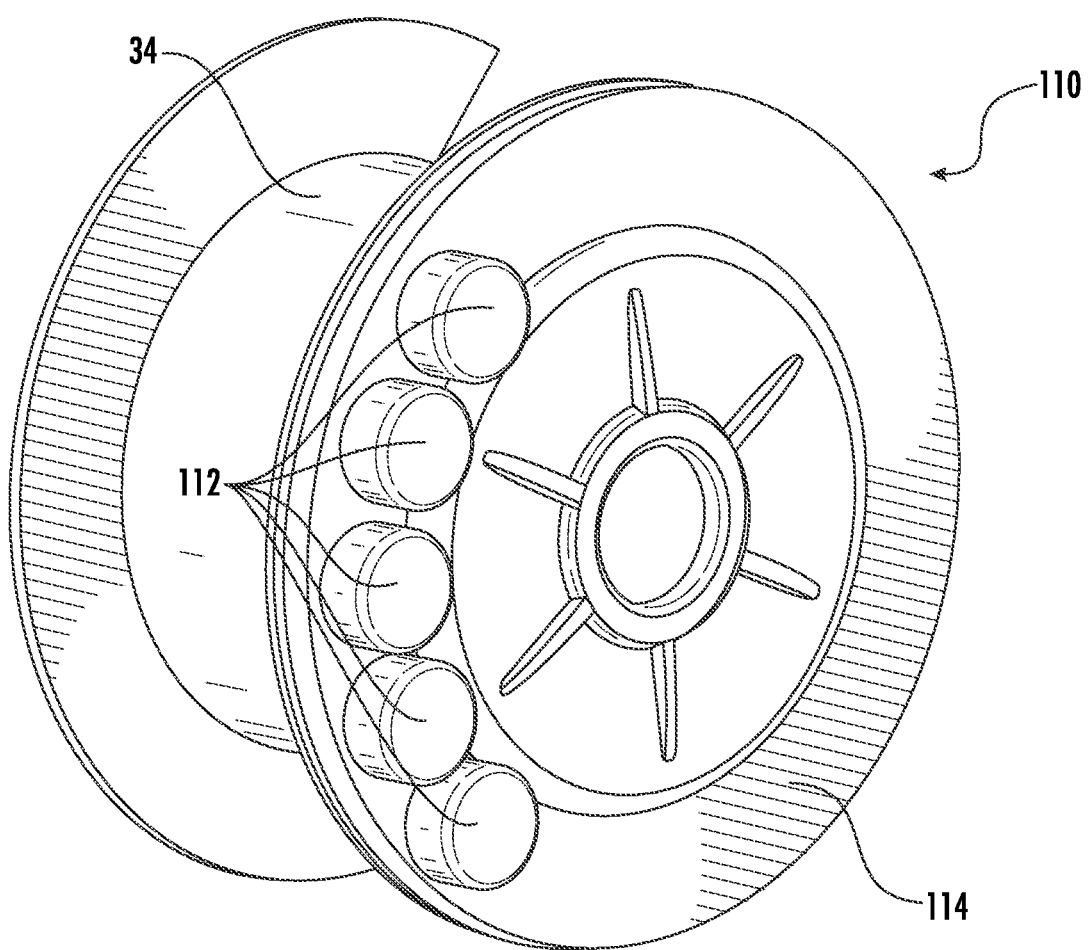
FIG. 3 is a perspective view of a tape reel of the tape measure of FIG. 1 showing an adjacent magnetic speed control system, according to an exemplary embodiment.
Figure 4:
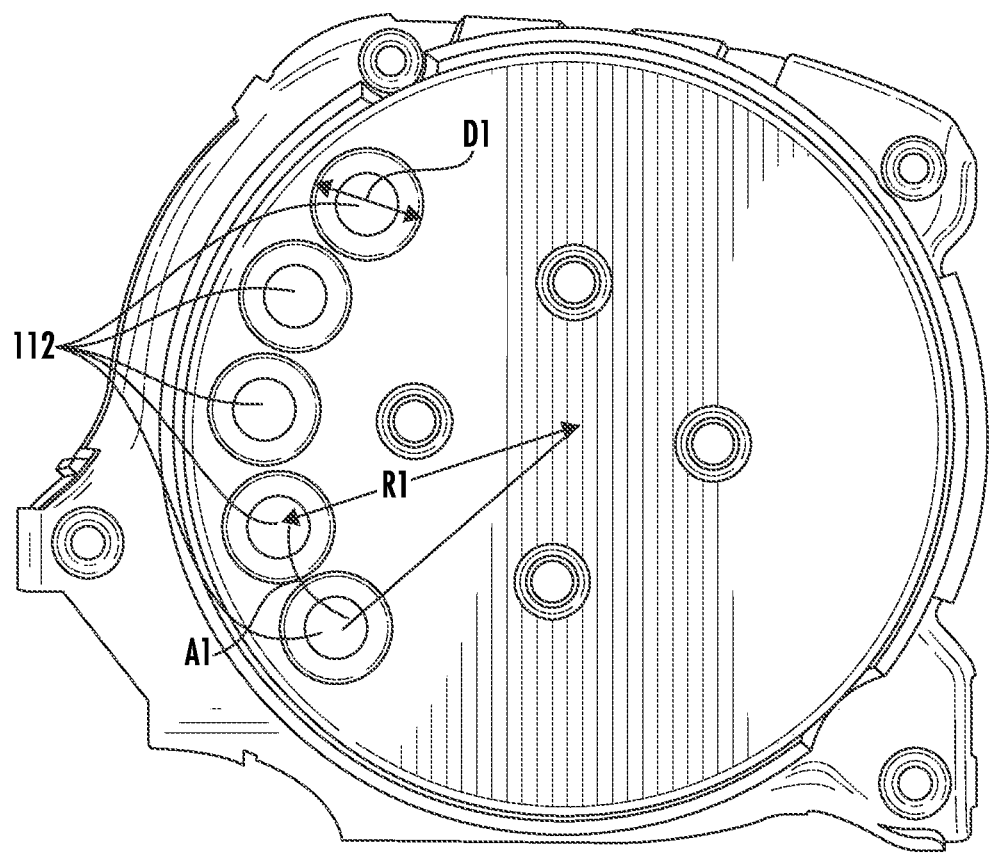
FIG. 4 is a side view of the tape reel of FIG. 3 showing the adjacent magnetic speed control system, according to an exemplary embodiment.
Figure 5:
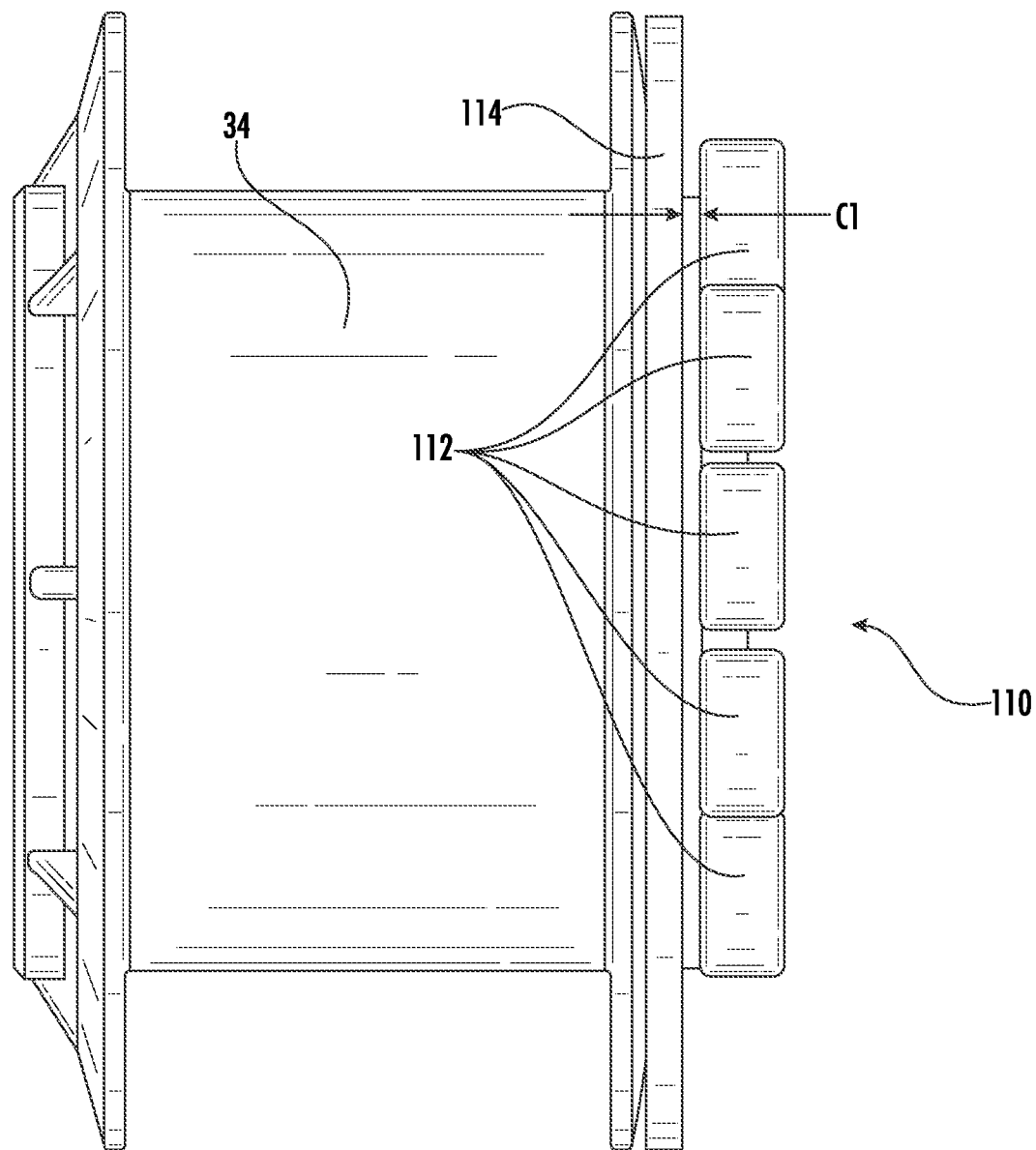
FIG. 5 is a front view of the tape reel of FIG. 3 showing the adjacent magnetic speed control system, according to an exemplary embodiment.

Referring generally to FIGS. 3-5, tape measure 10 includes a retraction speed control device, shown as magnetic speed controller 110. In general, speed controller 110 is a magnet based speed controller in which at least one magnet and/or an array of magnetic material, shown specifically as a plurality of magnets 112, induce eddy currents in one or more conductive components of tape measure 10 during reel rotation. The induced eddy currents generate magnetic fields, which in turn interact with one or more of the magnets 112 during rotation. This interaction creates a braking effect, limiting the rotational speed of reel 34. As will be understood, because the induction of the eddy currents is directly proportional to the rotational speed of the reel, the braking effect is low at low rotational speeds and increases as rotational speed increases, thus providing an upper rotational speed limit for a given spring strength.

In general, magnets 112 are supported within tape measure housing 18. In a specific embodiment, magnets 112 are coupled to the inner surface of tape measure housing 18 generally in the arrangement shown in FIGS. 3-5, adjacent to reel 34.

In specific embodiments, magnetic speed controller 110 includes a conductive element, shown as a plate of conductive material 114, in which the eddy currents are induced. It should be understood that the creating of eddy currents is provided by relative motion between magnets 112 and conductive material 114. Thus, as shown in the embodiment of FIGS. 3-5, conductive material 114 is located on reel 34 and magnets 112 are fixed in place within the tape measure housing. In some such embodiments, conductive material 114 is a plate of conductive material coupled to reel 34, and specifically coupled to one of the outer surfaces of the flanges of reel 34. In another embodiment, reel 34 or a portion of reel 34 is formed from the conductive material. In some embodiments, reel 34 is formed from a nonconductive material (e.g., a polymer material) and the braking eddy currents are induced within the wound tape blade located on reel 34 only and these provide the braking force. In other embodiments, magnets 112 are located on reel 34 and the braking eddy currents are induced within conductive components of tape measure housing 18 and/or in additional conductive components located within tape measure housing 18.

Conductive material 114 may be a wide variety of conductive materials suitable for the induction of eddy currents. In the prototypes tested as discussed below regarding FIG. 6A, conductive material 114 was aluminum. In the prototypes tested as discussed below regarding FIG. 6B, conductive material 114 was copper. In other embodiments, conductive material 114 is silver, gold, steel/iron, or other suitable conductive materials.

In various embodiments, Applicant has determined that the physical size, spacing and arrangement of magnets 112 within tape measure housing 18 can be selected to influence or control the degree of braking achieved by magnets 112. As one example, Applicant has determined that the total angular arc length of the arrangement of magnets 112 can be selected to control the braking effect of magnetic speed controller 110. As shown best in FIG. 4, magnets 112 are arranged in an arch having a total angular arc length of less than 180 degrees and specifically of between 60 degrees and 120 degrees. In the specific embodiment shown, magnetic speed controller 110 includes 5 magnets spanning a total angular arc length of between 75 degrees and 105 degrees and specifically of 90 degrees.

In various embodiments, Applicant has determined that the angular spacing, A1, of magnets 112, relative to the other adjacent magnets 112 can be selected to influence the braking provided by magnetic speed controller 110. Applicant testing has shown that this spacing may influence the braking effect by ensuring that the eddy currents induced by one magnet are generating magnetic fields that interact with the remaining magnets during spool rotation. In various embodiments, A1 is between 5 degrees and 60 degrees and specifically is between 15 degrees and 30 degrees. In a specific embodiment, magnetic speed controller 110 includes 5 magnets, and A1 is between 20 degrees and 25 degrees and more specifically A1 is 22.5 degrees. In another embodiment, magnets 112 are located all of the way around the tape reel.

In various embodiments, magnetic speed controller 110 includes at least 2 magnets arranged to generate eddy currents as discussed herein. In various embodiments, magnetic speed controller 110 includes between 2 and 50 magnets arranged to generate eddy currents as discussed herein. In specific embodiments, magnetic speed controller 110 includes between 2 and 10 magnets, specifically between 2 and 7 magnets arranged to generate eddy currents as discussed herein. In a specific embodiment, magnetic speed controller 110 includes 5 magnets, arranged to generate eddy currents as discussed herein, and in another embodiment, magnetic speed controller 110 includes 3 magnets, arranged to generate eddy currents as discussed herein. In another embodiment, magnetic speed controller 110 includes a single magnet, which in a specific embodiment is an arch shaped magnet.

In various embodiments, magnets 112 are sized to generate eddy currents as discussed herein. As shown in FIG. 4, magnets 112 have a width dimension, shown as diameter D1. Specifically, as shown, magnets 112 are cylindrically shaped having a diameter D1. In various embodiments, D1 is between 5 mm and 15 mm, specifically between 8 mm and 12 mm and more specifically is 9.5 mm.

As shown in FIG. 4, magnets 112 are positioned radially a distance R1 to position magnets adjacent conductive material 114 and/or the tape blade on reel 34 to allow for the induction of eddy currents as discussed herein. In various embodiments, R1 is between 15 mm and 40 mm, specifically between 25 mm and 30 mm and more specifically is 27.5 mm.

In various embodiments, magnets 112 may be arranged such that each magnet 112 has the same polar orientation as the other magnets of magnetic speed controller 110. In other embodiments, magnets 112 may be arranged such that each magnet 112 has the opposite polar orientation as the adjacent magnets of magnetic speed controller 110. As shown in FIG. 6A and FIG. 6B, in Applicant's testing, both magnetic orientations result in a measurable increase in retraction time.

In various embodiments, magnets 112 are made from a permanent magnetic material. In various embodiments, magnets 112 are rare earth magnets. In some embodiments, magnets 112 are formed from neodymium. In other embodiments, magnets 112 are ceramic or ferrite magnets. In some embodiments, magnets 112 may be an electromagnet, and in such embodiments, a power source (e.g., a battery) is located within the tape housing.

Referring to FIG. 5, in various embodiments, a gap is present between magnets 112 and conductive material 114 such that magnets 112 are spaced from conductive material 114 in the width direction by a clearance distance C1. Applicant has determined that clearance distance C1 can be adjusted to control the amount of magnetic braking provided by magnetic speed controller 110. In various embodiments, C1 is between 0.5 mm and 5 mm, and more specifically is between 0.8 mm and 1.5 mm. Unlike braking systems that use contact and friction, magnetic speed controller 110 provides braking without contact between the braking elements, and reel 34 and/or the tape blade wound on reel 34.

Referring to FIG. 6A, Applicant has tested braking provided by magnetic speed controller 110 in a variety of configurations. FIG. 6A shows the 8 ft. retraction time measured in seconds for a variety of different tape measure configurations. Magnetic speed controller 110 used to generate the data in FIG. 6A included 3 or 5 magnets, and in the 5 magnet tests R1 was 27.6 mm, A1 was 22.5 degrees or 45 degrees, D1 was 9.5 mm and C1 was 2.95 mm. In these tests, the conductive material 114 was aluminum.

In general, as can be seen in FIG. 6A, magnetic speed controller 110 dramatically increases the tested 8 ft. retraction time, specifically increased retraction time by about 13%. In addition as shown in FIG. 6A the angular spacing A1 is proportional to retraction time. Further, as can be seen in the last column of FIG. 6A, braking occurred even in a design without the addition of conductive material 114. Applicant believes this braking to be caused by eddy currents generated within the metal material of the tape blade located on reel 34. As shown in FIG. 6B, the retraction time increased, demonstrating higher levels of braking, when a copper conductor was used.

Figure 7:
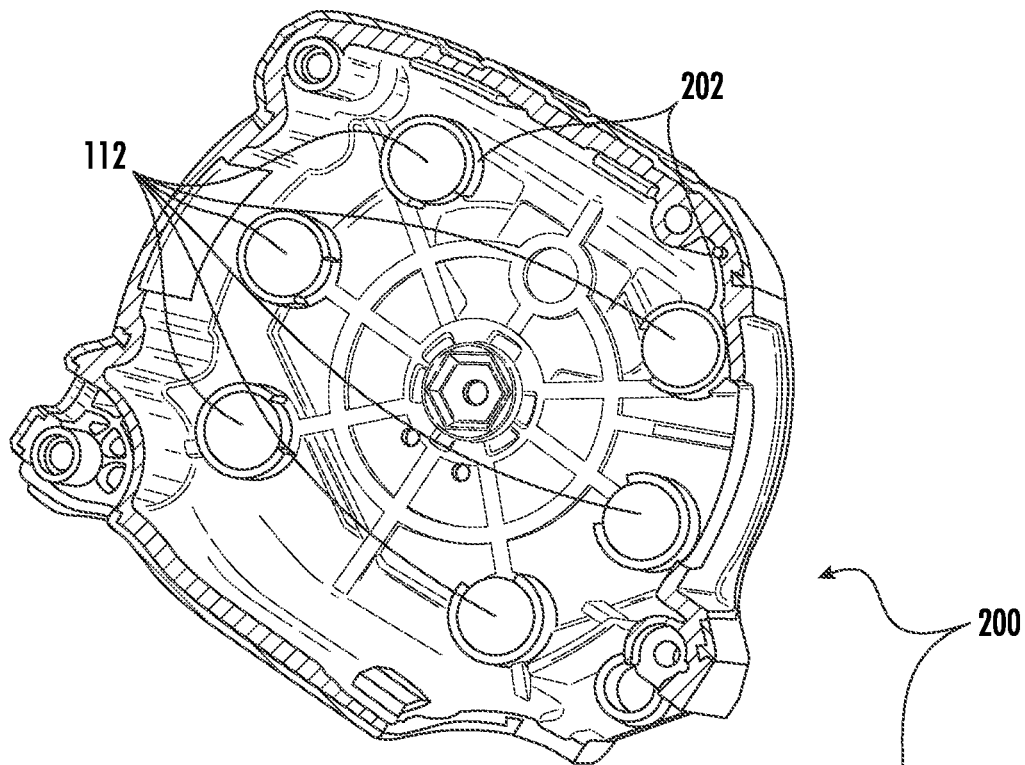
FIG. 7 shows magnet placement within a tape measure housing for a magnetic speed control system for a tape measure, according to an exemplary embodiment.
Figure 8:
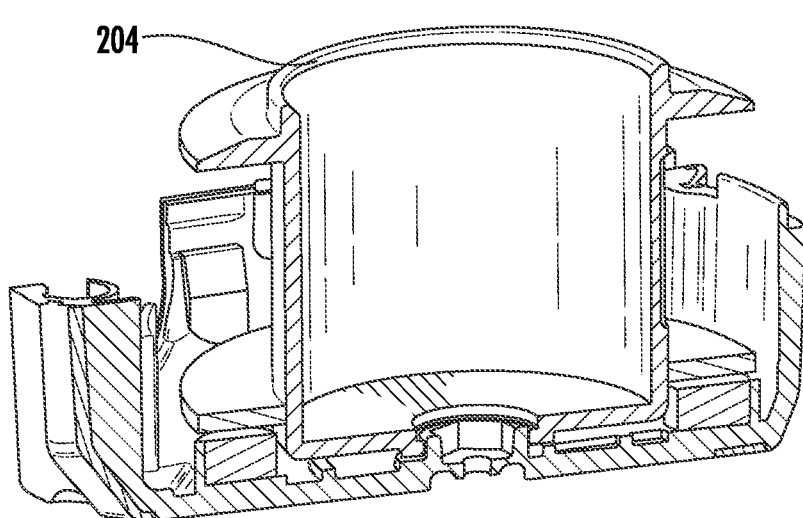
FIG. 8 shows a copper conductive plate of a magnetic speed control system for a tape measure, according to an exemplary embodiment.

FIGS. 7 and 8 show a tape measure with a magnetic speed controller 200. Magnetic speed controller 200 is substantially the same as magnetic speed controller 110 except for the differences discussed herein. As shown in FIG. 7, each magnet 112 is mounted to the tape measure housing within openings or cups 202 formed in the housing. The magnet array of magnetic speed controller 200 includes six magnets 112 positioned in two groups, and within each group, the angular spacing of the magnets is 45 degrees. As shown in FIG. 7, no magnets are located at the 12 o'clock position or at the 6 o'clock position. Applicant believes this arrangement provides adequate braking while limiting the amount of space used by the magnets or the need to change the outer profile of the tape measure housing.

FIG. 8 shows a conductive plate 204 formed from copper material. As shown in FIG. 8, plate 204 forms one of the flanges of tape reel 34. In contrast to the design discussed above in which the conductive plate is coupled to the tape spool flange, the design shown in FIG. 8 provides for a more compact tape measure design. In specific embodiments, the clearance between plate 204 and magnets 112 within magnetic speed controller 200 is between 0.5 mm and 1.5 mm and specifically is 1 mm.

Figure 10:
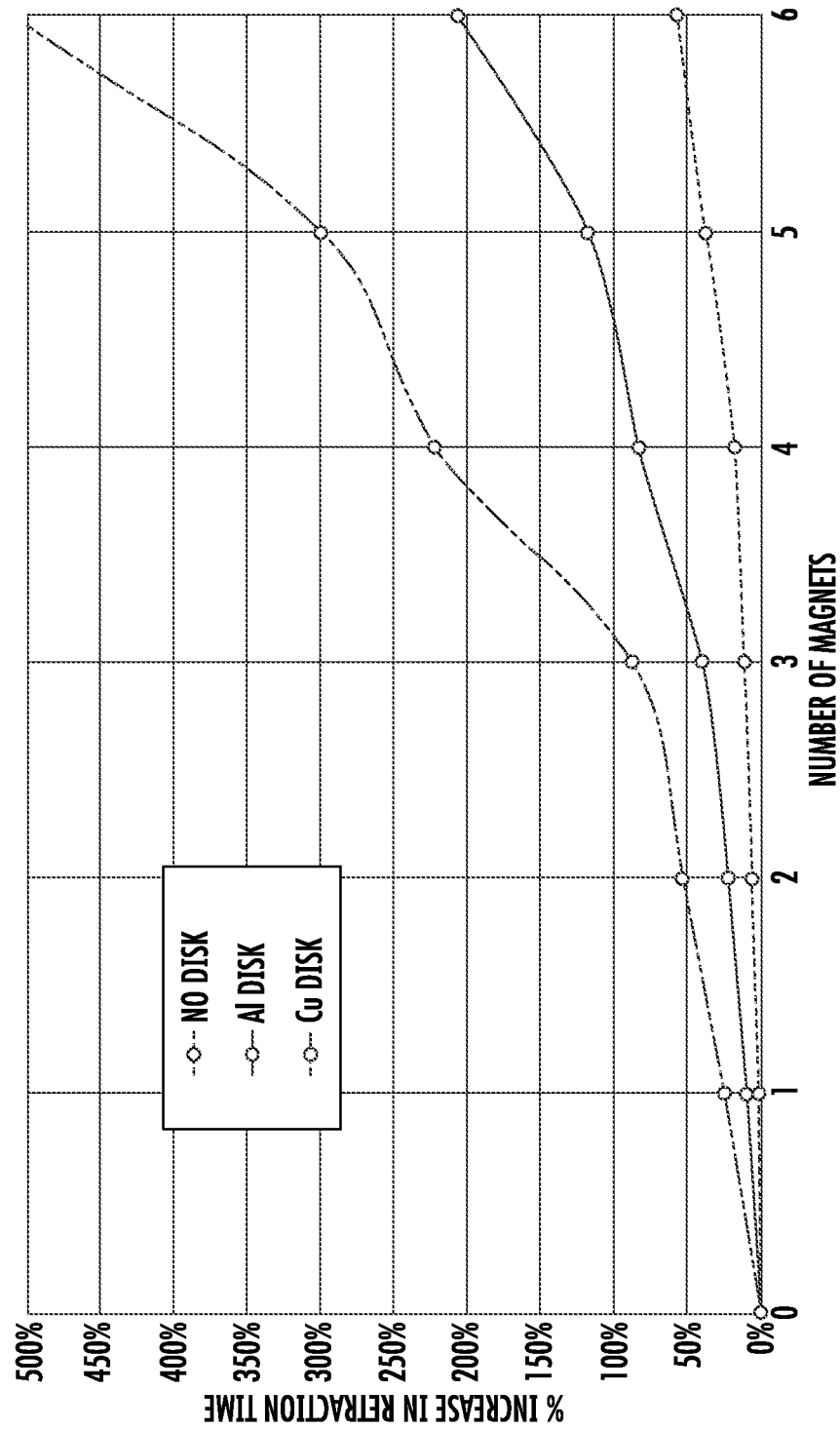
FIG. 10 is a graph of the percent increase in retraction time of the retraction speed control system of FIGS. 7 and 8 based on the number of magnets, for a copper conductive disk, an aluminum conductive disk and for no disk.

FIG. 9 shows the results of retraction time tests for tape measures with magnetic speed controller 200, showing the effect of different magnet numbers and the effect of the conductive disk and material on retraction times. As can be seen from FIG. 9, retraction time increase as the number of magnets increases, and copper for the conductive plate increases retraction time relative to aluminum conductive plate. FIG. 10 shows a graph of the percent increase in retraction time based on the number of magnets, for a copper conductive disk, an aluminum conductive disk and for no disk.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A tape measure comprising:
   a housing;
   a tape reel rotatably mounted within the housing;
   a tape blade wound around the tape reel and extendible from the housing;
   a retraction mechanism configured to drive rotation of the tape reel to provide retraction of the tape blade; and
   a retraction speed control system comprising:
      a conductive element located within the housing;
      a first magnet located within the housing; and
      a second magnet located within the housing;
      wherein an angular spacing between the first magnet and the second magnet measured relative to a rotational axis of the tape reel is between 5 degrees and 60 degrees;
      wherein rotation of the tape reel generates relative movement between the conductive element and the first and second magnets and induces current within the conductive element.

2. The tape measure of claim 1, wherein the conductive element is located on the tape reel and the first and second magnets are coupled to an inner surface of the housing.

3. The tape measure of claim 2, wherein the inner surface of the housing includes a first cup and a second cup and the first magnet is mounted in the first cup and the second magnet is mounted in the second cup.

4. The tape measure of claim 2, wherein the tape reel is formed from a polymer material and the conductive element is a plate of conductive metal material coupled to an outer surface of a side flange of the tape reel.

5. The tape measure of claim 1, further comprising a gap located between an outer surface of the conductive element and opposing faces of the first and second magnets, the gap defining a clearance distance measured between the outer surface of the conductive element and the opposing faces of the first and second magnets in a direction of an axis of rotation of the tape reel.

6. The tape measure of claim 5, wherein the clearance distance is between 0.5 mm and 5 mm.

7. The tape measure of claim 1, further comprising at least two additional magnets, wherein the first magnet, the second magnet and the at least two additional magnets are arranged in an arch having a total angular arc length of less than 180 degrees.

8. The tape measure of claim 7, wherein the total angular arc length is between 60 degrees and 120 degrees.

9. The tape measure of claim 1, wherein the angular spacing between the first magnet and the second magnet measured relative to the rotational axis of the tape reel is between 15 degrees and 30 degrees.

10. The tape measure of claim 1, wherein the first and second magnets are spaced a radial distance from the rotational axis of the tape reel of between 15 mm and 40 mm.

11. The tape measure of claim 1, wherein the first and second magnets each have a diameter of between 5 mm and 15 mm.

12. The tape measure of claim 1, wherein the conductive element is one of steel, copper, aluminum, silver or gold and the first and second magnets are rare earth magnets.

13. A tape measure comprising:
    a housing;
    a tape reel rotatably mounted within the housing;
    a tape blade wound around the tape reel and extendible from the housing;
    a retraction mechanism configured to drive rotation of the tape reel to provide retraction of the tape blade; and
    a retraction speed control system comprising:
       a conductive element located within the housing;
       a magnet located within the housing; and
       a gap located between an outer surface of the conductive element and an opposing face of the magnet, the gap defining a clearance distance measured between the outer surface of the conductive element and the opposing face of the magnet in a direction of an axis of rotation of the tape reel;
       wherein rotation of the tape reel generates relative movement between the conductive element and the magnet and induces eddy currents within the conductive element.

14. The tape measure of claim 13, wherein the clearance distance is between 0.5 mm and 5 mm.

15. A tape measure comprising:
    a housing;
    a reel rotatably mounted within the housing;
    a tape blade wound around the reel and extendible from the housing;
    a retraction mechanism configured to drive rotation of the reel to provide retraction of the tape blade; and
    a retraction speed control system configured to provide braking to the reel during retraction wherein an amount of braking force is proportional to a rotational speed of the reel.

16. The tape measure of claim 15, wherein the retraction speed control system comprises a magnet positioned in the housing such that rotation of the reel induces eddy currents within a conductive element located inside of the housing such that a retraction speed of the reel during retraction is reduced.

17. The tape measure of claim 16, wherein the conductive element is a coupled to one of the reel and an inner surface of the housing and the magnet is coupled to the other of the reel and the inner surface of the housing.

18. The tape measure of claim 16, wherein the conductive element is a conductive metal plate coupled to one of the reel and an inner surface of the housing and the magnet is one of an array of a plurality of magnets coupled to the other of the reel and the inner surface of the housing.

19. The tape measure of claim 18, wherein the array of the plurality of magnets are arranged in an arch having an angular spacing between adjacent magnets in the arch of between 5 degrees and 60 degrees.

20. The tape measure of claim 15, wherein the retraction mechanism comprises a spring coupled to the reel, wherein, as the tape blade is unwound from the reel to extend from the housing, the spring stores energy, and wherein the spring releases energy driving rewinding of the tape blade on to the reel.

21. The tape measure of claim 15, wherein the retraction speed control system is configured to provide braking to the reel without contact between the retraction speed control system and the reel or the tape blade.

* * * * *